United States Patent [19]
Duncan et al.

[11] Patent Number: 4,681,902
[45] Date of Patent: Jul. 21, 1987

[54] FLAME RETARDANT PHENOLIC FOAMS

[75] Inventors: Alexander W. S. Duncan, Epsom, England; David G. Summers, Gwent; Kenneth C. Thomas, South Glamorgan, both of Wales

[73] Assignee: BP Chemicals Limited, London, England

[21] Appl. No.: 926,992

[22] Filed: Nov. 3, 1986

[30] Foreign Application Priority Data

Nov. 16, 1985 [GB] United Kingdom ............... 8528294

[51] Int. Cl.$^4$ .............................................. C08J 9/14
[52] U.S. Cl. ...................................... 521/85; 521/88; 521/107; 521/108; 521/114; 521/181; 524/130; 524/132; 524/140; 524/141; 524/142; 524/145; 524/371
[58] Field of Search .................. 521/85, 88, 107, 108, 521/114, 181

[56] References Cited

U.S. PATENT DOCUMENTS

| | | | |
|---|---|---|---|
| 3,673,130 | 6/1972 | Papa et al. | 521/181 |
| 4,256,844 | 3/1981 | Martin et al. | 521/181 |
| 4,369,259 | 1/1983 | Tiroux et al. | 521/181 |
| 4,640,934 | 2/1987 | Michel | 521/181 |

*Primary Examiner*—Morton Foelak
*Attorney, Agent, or Firm*—Brooks, Haidt, Haffner & Delahunty

[57] ABSTRACT

This invention relates to flame retardant phenol aldehyde foams which have a k value below 0.020 W/mk. The foams have as flame retardants a blend of a halosubstituted diphenyl oxide and an organic phosphorus compound. The feature of the invention is that unlike conventional flame retardants, the blend now used does not adversely affect the low k value i.e. the low thermal conductivity of the foam.

10 Claims, No Drawings

FLAME RETARDANT PHENOLIC FOAMS

This invention relates to flame retardant phenol aldehyde foams, hereafter referred to as flame retardant phenolic foams, of improved properties and to a process for producing the same.

Phenolic foams are finding increasing use in building applications where their thermal insulation and fire resistant properties are of value. The preparation of such phenolic foams has been previously described and involves mixing a phenol formaldehyde resin of the type known in the art as a resole with a blowing agent, a cell stabilizer and a hardener which is typically a mineral or strong organic acid. The mixed ingredients are usually poured into a mould which is then placed in a warm oven to foam, cure and set. Alternatively, the mixed ingredients can be converted to cured foam in a continuous process, for example, by depositing the mixed ingredients onto a moving belt.

Cell stabilisers are also referred to in the art as surfactants or cell stabilising surfactants. For convenience the term cell stabiliser will be used in the present specification.

Cell stabilisers have been previously proposed in UK Pat. Nos. 1,537,947; 1,062,850 and 1,274,148 and have included ethoxylated derivatives of castor oil, typically prepared by reacting 40 molecules of ethylene oxide with one molecule of castor oil. Siloxane oxyalkylene copolymers have also proposed in French Pat. No. 2,354,361.

One of the problems with phenolic foams of low thermal conductivity prepared from conventional recipes is that they are prone to spalling upon exposure to a source of radiation or to a flame.

It is an object of the present invention to provide a process for producing fire retardant phenolic foams of improved properties, for example, water absorption, moisture vapor transmission, thermal conductivity and closed cell content by using a flame retardant in said foams which does not adversely affect the thermal insulation characteristics of the phenolic foam. The thermal conductivity value of a given foam is represented by 'k' and is measured at 10° C. according to BS 4370, Part 2. The thermal conductivity will hereafter be referred to as the "k value". The lower the k value the lower the thermal conductivity and the more desirable the foam.

Accordingly, the present invention is a flame retardant phenolic foam having a k value below 0.020 W/m k said foam having incorporated therein a flame retardant comprising (i) a halo-substituted diphenyl oxide with or without additional hydrocarbyl substituents in the phenyl nuclei and (ii) an organic phosphorus compound.

The flame retardant is suitably incorporated in the foam during the foaming of a resole resin using the conventional methods. For instance the flame retardant is added to the combination of the phenol-aldehyde resin, cell stabilizer, blowing agent and acid hardener.

The feature of the present invention is the choice of a flame retardant which virtually leaves the k value of the foam unaffected.

The halo-substituted diphenyl oxide component (i) in the flame retardant may be a mono-, di- or poly-halo-substituted diphenyl oxide, the pentahalodiphenyl oxide being preferred.

The halo-substituent in the diphenyl oxide may be chlorine, bromine or iodine, but is preferably bromine.

Thus a specific example of a halo-substitued diphenyl oxide is pentabromo-diphenyl oxide.

The halo-substituted dipehnyl oxide may contain hydrocarbyl substituents e.g. alkyl or aryl groups in the phenyl nuclei.

The organo phosphorus component (ii) in the flame retardant is suitably an organic phosphate or an organic phosphonate. Examples of organic phosphorus compounds include:

(a) phosphates and phosphonates which carry aliphatic or aromatic groups such as alkyl, haloalkyl or oxyalkyl and aryl, halo-substituted aryl and aryloxy groups;

(b) high molecular weight phosphates with or without halo-substituents;

(c) high molecular weight phosphonates with or without halo-substituents, and (d) phosphonates carrying amino-alkyl and hydroxy-alkyl groups.

A preferred example of the organic phosphorus compound is cresyl diphenyl phosphate.

In the flame retardant used during the foaming of the resole resin, the weight ratio of the halo-substituted diphenyl oxide component to the organic phosphorus component is suitably in the range from 5:95 to 95:5, preferably from 55:45 to 85:15.

It is preferable to use a blend of the two components and blending will be facilitated if the two components are either miscible or are in liquid form. A liquid flame retardant will also facilitate uniform mixing thereof in the foam forming reactants. Thus a liquid blend of pentabromodiphenyl oxide (70% w/w) and tolyl diphenyl phosphate (30% w/w) is most preferred.

The flame retardant is preferably incorporated into the reactants used for the foaming of the resole resin. The amount of flame retardant used is suitably from 0.5 to 20 parts by weight per 100 parts of the resole resin to be foamed, preferably from 3 to 7 parts by weight.

The foaming process used will be well known to those skilled in the art. A particularly preferred process for producing phenolic foams with a k value below 0.020 W/m k is that claimed and described in our published EP-A-170357.

It has been found that the flame retardant can be incorporated into the foaming process described in published EP-A-170357 and dispersed uniformly within that type of system by agitation and thereafter foaming of the resole resin carried out as described therein.

According to a further embodiment the present invention comprises a process for the production of flame retardant phenolic foams by curing a phenolic resin with a blowing agent, a hardener, a cell stabilizer, a flame retardant and a solvent compatible with the resin, characterised in that in the curing mixture (a) the phenolic resin has a formaldehyde to phenol mole ratio from 1:1 to 2.5:1 and in combination with any of the solvent inherently present therein has a viscosity of 500–10,000 centistokes at 25° C., (b) the blowing agent is a halogenated hydrocarbon, (c) the hardener is a mineral acid, (d) the cell stabilizer is derived by oxyalkylating castor oil or a hydrogenated derivative thereof with ethylene oxide or mixtures thereof with propylene oxide and/or butylene oxide, (e) the flame retardant comprises a halo-substituted diphenyl oxide and an organic phosphate as hereinbefore defined, (f) the total compatible solvents content of the reaction mixture inclusive of that present in the resin is from 7–30% by weight of which at least 40% by weight is water, and (g) the temperature within the mass of the curing resin mixture does not exceed 85° C.

The phenol formaldehyde resins also known as 'resoles' can be prepared by condensing 1 mole of phenol with 1 to 2.5 moles of formaldehyde using a base catalyst, e.g. sodium hydroxide. The resoles are preferably prepared by condensing 1 mole of phenol with 1.4 to 2.1 moles of formaldehyde.

For the purposes of the present invention it will be understood by those skilled in the art that phenolic resins of relatively higher viscosity may be used as starting materials provided that the total compatible solvent content of the curing reaction mixture is maintained within the specified range. It is however convenient to use a phenolic resin which inherently contains a compatible solvent and has a viscosity of 1000–10000 centistokes.

The phenolic resin (resole) used suitably has a viscosity of 1000 to 8000 centistokes, preferably 1000–5000 centistokes at 25° C. due to the solvent present therein. The solvent in the resin is suitably a polar solvent and may be water. The water or solvent content of the resin may be from 8–27% by weight, typically from 10 to 22% by weight although some or all of the water content may be replaced by other solvents compatible with the resin. For instance, if the resin has a water content of 20% by weight up to 50% of this water content may be replaced by other compatible solvents. Examples of such compatible solvents include aliphatic or alicyclic hydroxy compounds and esters thereof. Specificaly the hydroxy compounds may be selected from ethylene glycol, propylene glycol, diethylene glycol and dipropylene glycol, and the ester is suitably that derived from mono, di or polycarboxylic acids and may be a phthalate ester such as the dimethyl phthalates e.g. dimethyl isophthalates.

The blowing agent is preferably a halogenated methane or ethane for example trichloro trifluoro ethane (sold under the trade mark of Freon 113), or trichlorofluoro methane (Freon 11), and these blowing agents give products of lower thermal conductivity than those obtained using hydrocarbon blowing agents such as pentane.

The hardener is suitably an aqueous mineral acid, preferably aqueous sulphuric acid, most preferably an aqueous solution containing 50–75% by weight of sulphuric acid. The total compatible solvent content of the reaction mixture inclusive e.g. of the water or other solvents present in the phenolic resin and the water present in the aqueous hardener used is from 7 to 30% by weight, preferably from 10–27% by weight. Of the total solvent at least 40% by weight is water, preferably at least 50% by weight is water.

Castor oil is a glyceride in which the glycerol is esterified predominantly with ricinoleic acid. The cell stabilizer is prepared from castor oil as such or from a hydrogenated derivative thereof. The hydrogenated derivative may be either fully or partially hydrogenated with respect to the unsaturation in the ricinoleic acid moiety in castor oil. Thus, castor oil or its hydrogenated derivative can be oxyalkylated with ethylene oxide or mixtures thereof with propylene oxide and/or butylene oxide. Where a mixture or propylene oxide and ethylene oxide is used the oxyalkylated product suitably contains up to 60 propylene oxide units and up to 200 ethylene oxide units to form the cell stabilizer. The cell stabiliser preferably contains up to 40 propylene oxide units and from 20 to 60 ethylene oxide units. The oxyalkylene units can be random or arranged in blocks, the former being preferred.

Details regarding the flame retardant and the amounts to be used have already been given above.

The foaming and curing reaction is exothermic and the resin and the hardener are chosen depending upon the nature of the final end product. It is essential that the temperature within the mass of the curing resin mixture does not exceed 85° C., is suitably between 50° C. and 85° C., and is preferably from 60° to 80° C. For a given foam density, the rate at which heat is dissipated from the foam to the surroundings during the curing reaction will depend upon the surface to volume ratio of the foam. Larger surface to volume ratios result in increased rates of dissipation of heat. Consequently, the combination of resin and hardener chosen for a curing reaction will depend upon the surface to volume ratio of the desired foam. Thus for producing a thin laminate, which has a large surface area and hence a faster rate of heat dissipation, a resin-hardener combination may be chosen which is relatively more exothermic than the combination chosen for a thick block of foam.

The process of the present invention enables closed cell, flame retardant foams with the following properties to be produced:

(i) water absorption values which are less than 6.0% (ISO 2896, 50 mm cube, 7 day immersion, %v/v)

(ii) moisture vapour transmission (MVT) less than 15 microgram meter per Newton hour (BS 4370 Part 2), (iii) a stable closed cell content greater than 80% (ASTM D 2856-70 reapproved 1976, Procedure C) and (iv) k values less than 0.020 W/m k according to S 4370, Part 2 at 10° C.

The mixing, foaming and curing of the ingredients can be carried out by any of the methods currently employed either batchwise or continuously.

A feature of the present invention is that the flame retardant properties of the resultant phenolic foams are improved significantly without affecting the inherent closed cell structure and the physical properties of k value of the foam.

It has also been found that the closed cell, phenolic foam insulant, treated according to the present invention shows a marked reduced tendency towards spalling when exposed to radiant heat or a flame source.

The present invention is further illustrated with reference to the following Examples.

EXAMPLE 1

All quantities are weight for weight unless otherwise stated.

A. Resin Preparation

A phenolic resole was prepared in the conventional way. Aqueous formaldehyde (36.6%) (1.5 moles) was reacted with phenol (1 mole) using as a catalyst sodium hydroxide (1.23% by weight of phenol charged).

The reaction mixture was heated to 60° C. over a 45 minute period and held at 60° C. for 30 minutes. The temperature was carefully increased to 80° C. and held for 30 minutes at 80° C. The temperature was again increased to permit a 45 minute reflux period. Water was then vacuum distilled to give a material with water content of 20%. It was then held at 70° C. to give a material with a viscosity of 3338 centistokes at 25° C. To 100 parts of this material was added 4 parts of diethylene glycol. The resultant resin had a viscosity of 2550 centistokes at 25° C. and a water content of 19.2% by weight. The resultant resin was stored at 10° C. until used.

B. Foam Preparation

In the Example the following formulation was used in which
CO represents castor oil
EO represents ethylene oxide
PO represents propylene oxide

| Formulation | Parts by weight |
| --- | --- |
| Phenolic resin (Section A) | 100 |
| Cell stabiliser CO + 50 EO + 15 PO | 2 |
| Cell stabiliser CO + 40 EO | 2 |
| Flame retardant additive [liquid blend of pentabromophenyl oxide (70% w/w) and cresyl diphenyl phosphate (30% w/w)] | 5 |
| Freon 113 (Regd. Trade Mark) | 10 |
| Freon 11 (Regd. Trade Mark) | 5 |
| Aqueous sulphuric acid hardener (50%) | 10 |

The cell stabiliser and flame retardant were mixed with the resin prepared as in Section (A) above and the mixture was prewarmed to a temperature of 30° to 32° C. Then the Freon blend was added and mixed until a uniform emulsion had formed and followed by aqueous sulphuric acid. The total solvent content of the reaction mixture was 22.5% by weight.

The mixture was poured into a wooden mould preheated to 40° C., allowed to rise, cure and set in an oven at 50° C. for 2 hours. The foam was then removed from the mould and stored for 3 days at ambient temperature before being cut and tested.

C. Testing

Results of tests for thermal conductivity and French and German fire tests are shown in the Table. The results for foam made according to Example 1B are compared with foam made without flame retardant additive.

|  |  | With Additive* | Without Additive |
| --- | --- | --- | --- |
| Thermal Conductivity (k value) after 141 days at 23° C. W/mK |  | 0.0175 | 0.0165 |
| French Radiation Test, NFP 92501 |  |  |  |
| Ignition index | i | 0 | 0.95 |
| Flame development index | s | 0 | 0.06 |
| max. flame height index | h | 0 | 0.15 |
| spalling |  | Little | Much |
| German Flue Test DIN4102 Pt.1 (1) |  |  |  |
| Max. Flame height | cm | 60 | >100 |
| Max. Flue gas temp. | °C. | 134 | 421 |
| Max. Smoke reading (light absorption) | % | 7 | 77 |
| Mean Residual Lengh | cm | 15 | ND(2) |
|  |  | Little | Much |

*Liquid blend of pentabromophenyl oxide (70% w/w) and cresyl diphenyl phosphate.
(1) Sample thickness = 80 mm
(2) ND = not determined The thermal conductivity of the foam is not significantly increased by incorporation of the flame retardant additive.

A significant reduction in spalling was observed in the flame-retardant foam during the French radiation test and an optimum result of zero was obtained on the basis of the flammability indices.

A significant reduction in spalling was also seen in the German flue test. At 80 mm specimen thickness the debris from the spalling of the foam without additive accumulated to such an extent that it caused very rapid flame spread and an unacceptably large rise in flue gas temperature.

The following Comparative Test (not according to the invention) shows the deleterious effect of a conventional flame retardant on 'low k' performance of a phenolic foam.

Comparative Test (not according to the invention)

A resin prepared according to the procedure in Example 1, Section A was converted into foam using the following formulation in which CO represents castor oil, EO represents ethylene oxide and PO represents propylene oxides.

| Phenolic resin | 100 |
| --- | --- |
| Cell stabiliser CO + 50 EO + 15 PO | 2 |
| Cell stabiliser CO + 40 EO | 2 |
| Flame retardant additive | 5 |
| (dicyandiamide resin "Melflam"* 131, (Registered Trade Mark)) | 5 |
| Freon 113 | 10 |
| Freon 11 | 5 |
| Aqueous sulphuric acid | 10 |

*This is a halogen free product containing a phosphorus compound together with the resin in aqueous solution.

The foaming and curing of the mixture was carried out as described in Example 1, Section B. Thermal conductivity of the foam after 2 days at 23° C. was 0.025 W/mK and after 6 days was 0.030 W/mK which indicates a deterioration in the properties of the foam.

We claim:
1. A flame retardant resole foam having a k value below 0.020 W/m k said foam having incorporated therein a flame retardant comprising:
 (i) a halo-substituted diphenyl oxide with or without additional hydrocarbyl substituents in the phenyl nuclei, and
 (ii) an organic phosphorus compound.
2. A flame retardant resole foam according to claim 1 wherein the halo-substituted diphenyl oxide is selected from a mono-, di- or polyhalo-substituted diphenyl oxide.
3. A flame retardant resole foam according to claim 2 wherein the halo-substituted diphenyl oxide is pentabromo diphenyl oxide.
4. A flame retardant resole foam according to any one of the preceding claims wherein the organo phosphorus compound is an organic phosphate or an organic phosphonate.
5. A flame retardant resole foam according to claim 1 or 2 wherein the organic phosphorus compound is tolyl diphenyl phosphate.
6. A flame retardant resole foam according to claim 1 or 2 wherein the weight ratio of the halo-substituted diphenyl oxide component to the organic phosphorus component in the flame retardant is in the range from 5:95 to 95:5.

7. A flame retardant resole foam according to claim 1 or 2 wherein the flame retardant is used as a liquid blend of the halo-substituted diphenyl oxide (70% w/w) and the organic phosphorus compound (30% w/w).

8. A flame retardant resole foam according to claim 1 or 2 wherein the amount of flame retardant incorporated is from 0.5 to 20 parts by weight per 100 parts of the resole resin.

9. A process for the production of flame retardant resole foams by curing a resole resin with a blowing agent, a hardener, a cell stabilizer, a flame retardant and a solvent compatible with the resin, characterised in that in the curing mixture
  (a) the resole resin has a formaldehyde to phenol mole ratio from 1:1 to 2.5:1 and in combination with any of the solvent inherently present therein has a viscosity of 500–10,000 centistokes at 25° C.,
  (b) the blowing agent is a haogenated hydrocarbon,
  (c) the hardener is a mineral acid,
  (d) the cell stabilizer is derived by oxyalkylating castor oil or a hydrogenated derivative thereof with ethylene oxide or mixtures thereof with propylene oxide and/or butylene oxide,
  (e) the flame retardant comprises a halo-substituted diphenyl oxide and an organic phosphate,
  (f) the total compatible solvents content of the reaction mixture inclusive of that present in the resin is from 7–30% by weight of which at least 40% by weight is water, and
  (g) the temperature within the mass of the curing resin mixture does not exceed 85° C.

10. A process according to claim 9 wherein the flame retardant is first mixed with the resin and the cell stabilizer, prewarmed, then mixed with the blowing agent to form an emulsion, and finally mixed with the hardener and allowed to cure into a foam at elevated temperature.

* * * * *

UNITED STATES PATENT AND TRADEMARK OFFICE
CERTIFICATE OF CORRECTION

PATENT NO. : 4,681,902
DATED : July 21, 1987
INVENTOR(S) : Alexander W.S. Duncan It is certified that error appears in the above-identified patent and that said Letters Patent is hereby corrected as shown below:

Col. 2, line 1 "halo-substitued" should read
-- halo-substituted --

Col. 4, line 38 "according to S 4370" should read
-- according to BS 4370 --

Col. 7, line 18 "haogenated" should read
-- halogenated --

Signed and Sealed this

First Day of December, 1987

Attest:

DONALD J. QUIGG

Attesting Officer  Commissioner of Patents and Trademarks